United States Patent [19]
Benn et al.

[11] Patent Number: 4,943,487
[45] Date of Patent: Jul. 24, 1990

[54] CORROSION RESISTANT COATING FOR OXIDE DISPERSION STRENGTHENED ALLOYS

[75] Inventors: Raymond C. Benn; Gaylord D. Smith, both of Huntington, W. Va.; Donald H. Boone, Walnut Creek, Calif.

[73] Assignee: INCO Alloys International, Inc., Huntington, W. Va.

[21] Appl. No.: 220,836

[22] Filed: Jul. 18, 1988

[51] Int. Cl.$^5$ .............................................. B22F 3/26
[52] U.S. Cl. .................................... 418/552; 428/67 P
[58] Field of Search ............... 428/546, 548, 552, 553, 428/678

[56] References Cited

U.S. PATENT DOCUMENTS

| | | | |
|---|---|---|---|
| 3,846,159 | 11/1974 | Bornstein et al. | 117/71 M |
| 4,095,003 | 6/1978 | Weatherly et al. | 427/34 |
| 4,198,442 | 4/1980 | Gupta et al. | 427/34 |
| 4,248,940 | 2/1981 | Goward et al. | 428/633 |
| 4,284,688 | 8/1981 | Stucheli et al. | 428/559 |
| 4,326,011 | 4/1982 | Goebel et al. | 428/641 |
| 4,371,570 | 2/1983 | Goebel et al. | 427/248.1 |
| 4,399,199 | 8/1983 | McGill et al. | 428/633 |
| 4,446,199 | 5/1984 | Gedwill et al. | 428/539 |
| 4,451,496 | 5/1984 | Gedwill et al. | 427/34 |
| 4,485,151 | 11/1984 | Stecura | 428/633 |

FOREIGN PATENT DOCUMENTS

| | | |
|---|---|---|
| 3104581 | 1/1982 | Fed. Rep. of Germany . |
| 2207198 | 8/1974 | France . |
| 2407272 | 12/1979 | France . |
| 2444559 | 5/1980 | France . |

OTHER PUBLICATIONS

Derwent's Chemical Patent Index, Week X48, p. 15, Abstract No. 30716V/17.
"The Development of an ODS Turbine Blade Alloy (Inconel ® Alloy MA 6000) for Use in Small Gas Turbine Engines", by R. G. Wing, pp. 287–305, in Frontiers of High Temperature Materials II, ed. by J. B Benjamin & R. C. Benn, Inco Alloys International, Inc., 1983.
"Hot Corrosion Testing of Oxide Dispersion Strengthened Nickel Base Alloys", by P. Huber, pp. 317–326, Id.
"High Temperature Behavior of Different Coatings in High Performance Gas Turbines and in Laboratory Tests", by L. Peich and G. Johner, pp. 2583–2592, J. Vac. Sci. Techol., Nov./Dec. 1986, No. 6.
"High-Temperature Corrosion of LPPS-Coated Inconel Alloy MA 6000", by G. D. Smith an R. C. Benn, pp. 201–214, Surface and Coatings Technology, 32, (1987).
"Coatability of High Gamma-Prime ODS Superalloys", by R. C. Benn, P. Deb and D. H. Boone, pp. 1–19, Proc. High Temperature Coatings Symp. AIME-/ASM Conference, Orlando, FL, Oct. 1986.
"Some Developments in the Coatability of ODS Superalloys", by R. C. Benn, D. H. Boone and G. D. Smith, pp. 159–167, Proc. First ASM Europe Technical Conference, ed. by T. Khan and A. Lasalmonie, Sep. 1987.

Primary Examiner—Brooks H. Hunt
Assistant Examiner—Ngoclan T. Mai
Attorney, Agent, or Firm—Edward A. Steen; Francis J. Mulligan, Jr.

[57] ABSTRACT

A corrosion resistant duplex coating for oxide dispersion strengthened alloys permitting high temperature applications is disclosed. An inner coating substantially free of oxide dispersoids and compatible with the substrate is sandwiched between the substrate and an outer layer of the MCrAlY type.

20 Claims, No Drawings

CORROSION RESISTANT COATING FOR OXIDE DISPERSION STRENGTHENED ALLOYS

TECHNICAL FIELD

The instant invention relates to oxide dispersion strengthened ("ODS") alloys in general and, more particularly, to a duplex coating for ODS alloys. The coating increases the resistance of these alloys to the perils of hot corrosion typically encountered in turbine hot sections.

BACKGROUND ART

In order to increase the efficiency and power output of gas turbines, there generally must be a concomitant increase in the operating temperatures and pressures of these engines. Unfortunately, as increased demands are placed upon existing materials systems they begin to fail thereby placing a practical limit on operating parameters.

Over the years various materials have been developed and utilized to overcome the previous difficulties and boost the performance of the engines.

In particular, complex oxide dispersion strengthened superalloys may be fabricated from powder made by the mechanical alloying process described in, for example, U.S. Pat. No. 3,591,362. These alloys have a complex composition, being strengthened with several solid solution additions, such as molybdenum, tungsten, rhenium, (niobium and tantalum to a lesser extent), gamma prime ($Ni_3Al$) for intermediate temperature strength and yttria ($Y_2O_3$) for extreme elevated temperature creep and stress rupture resistance. These alloys are given elaborate heat treatments to develop both a high aspect ratio grain structure and the correct gamma prime structure. Alloys of this type are ideally suited, strengthwise, for airfoil section components in gas turbines and, in particular, to industrial gas turbines where long service life is a paramount consideration. However, as is common with almost all superalloys, these oxide dispersion strengthened superalloys are not satisfactorily resistant to hot corrosion for extreme temperatures and/or long service lives. This is especially true for those turbines operating in marine environments and/or consuming low grade fuels containing such contaminants as sulfur, vanadium, sodium chloride and organic phosphates.

A non-limiting example of a mechanically alloyed superalloy is INCONEL ® alloy MA 6000 produced by assignee. INCONEL alloy MA 6000 is a mechanically alloyed nickel-base superalloy strengthened by both oxide dispersion strengthening and precipitation hardening for high creep and rupture properties at 1095° C. (2000° F.). Useful as it is because of good oxidation and sulfidation resistance, it was recognized that by increasing its resistance to corrosion attack at elevated temperatures, it would be ideal for turbine airfoil applications. A possible technique for increasing this (and any ODS) alloy is coating the material.

Various types of hot corrosion resistant coatings have been evaluated on these alloys to extend their service life. Aluminizing, low activity aluminizing and platinum aluminizing result in coatings that fail in relatively short times due to the formation of Kirkendall porosity at or immediately adjacent to the coating/ substrate interface. Kirkendall porosity leads to coating loss particularly under thermal cycle conditions as the voids coalesce into continuous cracks in the region of the maximum diffusion gradient. The Kirkendall porosity is the result of interdiffusion between the coating and the substrate. NiCoCrAlY(Ta) plasma spray and physical vapor deposition coatings have been found that are less prone to Kirkendall voiding than aluminide coatings. However, these coatings result in less than satisfactory service lives due primarily to the diffusion of aluminum from the coating into the substrate and the diffusion of nickel from the substrate into the coating.

A coating system is needed to assure long service life of oxide dispersion strengthened, gamma prime containing superalloys that will be exceptionally resistant to the formation of Kirkendall porosity at elevated operating temperatures. Such a coating system may be based on NiCoCrAlY(Ta) compositions provided that a means is found to inhibit the interdiffusion between the coating and the substrate. As far is as known, attempts to solve this interdiffusion problem have been unsuccessful. A diffusion barrier based on zirconium dioxide ($ZrO_2$) results in severe limitations to operating conditions owing to the poor resistance to induced stresses of the coating system. In a different approach, U.S. Pat. No. 4,675,204 discloses melting a 0.3 to 0.5 mm layer of the substrate using a high energy beam in order to free this zone of yttria particles, which tend to act as nucleation sites for the vacancies resulting from interdiffusion. This concept is difficult to achieve on actual hardware owing to the complexity of the process and because the interdiffusion mechanism is not significantly inhibited by removing the yttria from the substrate.

SUMMARY OF THE INVENTION

Accordingly, there is provided a dispersion free intermediate coating that is compatible in composition and diffusivity with both the oxide dispersion strengthened substrate alloy and the outer coating layer. The resulting configuration permits the use of mechanically alloyed materials in high temperature environments with an attendant resistance to debilitating hot corrosion over a lengthy period of time.

PREFERRED MODE FOR CARRYING OUT THE INVENTION

A long life coating system for oxide dispersion strengthened, gamma prime containing superalloys may be achieved by applying to the superalloy substrate an inner coating initially and substantially free of yttria that is compositionally compatible with both the substrate and an outer layer of the NiCoCrAlY(Ta) type which is exceptionally hot corrosion resistant. The composition of this inner coating is defined by compositional limits for certain elements which are determined by the level of these same elements in both the substrate and the outer coating. Application of this inner coating composition may be by air or vacuum plasma spraying or by physical vapor deposition. The preferred inner coating thickness may be between 50 and 100 microns, although greater thicknesses may be advantageous in certain instances. An optimal compositional range contains 15-20% chromium, 5-7% aluminum, 4-6% tantalum, 0-5% tungsten, balance nickel. The alloy is gas atomized and vacuum plasma sprayed on the substrate material. Heat treatment of the inner layer prior to application of the NiCoCrAlY(Ta) protective coating is preferred but not essential.

Another non-limiting example of a mechanically alloyed ODS superalloy is INCONEL alloy MA 754. It too contains oxide dispersoids and exhibits high temperature strength characteristics due, in part, to controlled thermomechanical processing techniques.

A number of ODS materials were prepared as substrate candidates for a burner rig test. Table 1 lists the particulars for the substrate alloys.

TABLE 1

NOMINAL COMPOSITION OF SUBSTRATE ALLOYS, WEIGHT PERCENT

| Alloy | C | Cr | Al | Ni | Ti | W | Mo | Ta | B | Zr | $Y_2O_3$ |
|---|---|---|---|---|---|---|---|---|---|---|---|
| A | 0.05 | 20.0 | 0.3 | Bal. | 0.5 | — | — | — | — | — | 0.6 |
| B | 0.05 | 20.0 | 3.0 | Bal. | 0.5 | — | — | — | — | — | 0.6 |
| C | 0.05 | 20.0 | 4.0 | Bal. | 0.5 | — | — | — | — | — | 0.6 |
| D | 0.05 | 15.0 | 4.5 | Bal. | 2.5 | 4.0 | 2.0 | 2.0 | 0.01 | 0.15 | 1.1 |
| E | 0.05 | 9.5 | 7.0 | Bal. | — | 8.0 | 2.0 | 1.0 | 0.01 | 0.15 | 1.1 |
| F | 0.05 | 20.0 | 6.0 | Bal. | — | 3.5 | 2.0 | — | 0.01 | 0.15 | 0.95 |
| G | 0.05 | 20.0 | 6.5 | Bal. | 2.5 | 4.0 | 2.0 | 2.0 | 0.01 | 0.15 | 0.95 |

NOTE:
Alloy A is INCONEL ® alloy 754
Alloy D is INCONEL ® alloy 6000
Alloy E is ODS alloy 69

Table 2 lists three inner and outer coatings.

TABLE 2

NOMINAL COMPOSITION OF INNER AND OUTER COATINGS, WEIGHT PERCENT

| Alloy | Coating Type | Cr | Al | Ni | Co | Ta | W | Y |
|---|---|---|---|---|---|---|---|---|
| 1 | Inner | 20 | 5 | Bal. | — | 6 | — | — |
| 2 | Inner | 15 | 6.5 | Bal. | — | 5 | 5 | — |
| 3 | Outer | 20 | 8 | Bal. | 23 | 4 | — | 0.6 |

NOTE:
Alloy 3 is commercially available AMDRY ® 997

To establish a basis for comparison, alloy D was exposed in a General Electric Lynn ® low velocity burner rig at 1095° C. (2000° F.) for 312 hours. The uncoated pin (3.2 mm diameter × 44.5 mm length) was cycled for 58 minutes within the burner rig flame and for 2 minutes in an air blast at room temperature. The burner rig burned JP-5 fuel to which was added 5 ppm sodium chloride and 0.3% sulfur as ditertiary butyl disulfide. After exposure, the diameter of its test pin as measured 12.7 mm from the top of the pin was found to have expanded by 1.6% due to internal sulfidation and scale formation. Metallographic and scanning electron microscope examination revealed an 8 micron oxide scale on the alloy rich in aluminum, nickel and titanium although some chromium was present. The substrate contained chromium sulfides (CrS) and aluminum oxide ($Al_2O_3$) to a depth of 85 microns. Energy dispersive X-ray analysis showed that 20% of the chromium content was lost from the first 125 microns and 75% of the aluminum was lost from the 75 microns. These findings clearly demonstrate the need for a protective coating for the alloys of Table 1 in order to achieve extended service at elevated temperatures.

It was expected that the inner coatings of Table 2 by themselves could not protect the substrates from hot corrosion for extended periods of time because of the relatively low availability of aluminum. The data of Table 3 bears this out. Similarly, a sole NiCoCrAlY(Ta) coating on the substrate would be deficient for the reasons stated beforehand. However, in combination, the instant duplex coating system results in desirable, long term operability at elevated temperatures.

Table 3 discloses a number of coating/substrate permutators and the results of tests on them.

TABLE 3

BURNER RIG (SULFIDATION/OXIDATION) CORROSION RESISTANCE AFTER 504 HOURS AT 1082° C. (1980° F.) FOR COATING SYSTEMS

| Item | Alloy | Gradient Coating | Outer Coating | Metal Loss (mils) | Maximum Attack (mils) | Mass Loss* ($mg/cm^2$) |
|---|---|---|---|---|---|---|
| 1 | A | 1 | None | 12.2 | 31.0 | — |
| 2 | A | 1 | 3 | 4.7 | 4.7 | — |
| 3 | B | 1 | None | 10.5 | 38.5 | — |
| 4 | B | 1 | 3 | 3.9 | 5.1 | — |
| 5 | C | 1 | None | 9.6 | 36.7 | — |
| 6 | C | 1 | 3 | 4.8 | 6.9 | — |
| 7 | E | 2 | None | 7.9 | 28.7 | — |
| 8 | E | 2 | 3 | 2.9 | 5.0 | — |
| 9 | F | 1 | 3 | 3.6 | 5.9 | — |
| 10 | G | 1 | 3 | 3.7 | 4.1 | — |
| 11 | D | None | 3 | — | — | −2.28 |
| 12 | D | 1 | 3 | — | — | −1.34 |
| 13 | D | 2 | 3 | — | — | −2.11 |
| 14 | D | None | 3 | — | — | — |

*Oxidation testing was conducted in air plus 5% water vapor at 1100° C. (2012° F.) for 1008 hours For example, the protective NiCoCrAlY(Ta) powder composition alloy 3 (Table 2) was vacuum plasma sprayed on substrate D (Table 3, items 11 and 14). The coatings were typically between 100 and 200 microns thick. The substrate pins were 9.5 mm diameter × 75 mm length. Following coating, the pins were heat treated in vacuum for 4 hours at 1080° C. (1976° F.). The specimens were then oxidation tested as described above for 1008 hours at 1100° C. (2012° F.). Following testing, the specimens were metallographically examined. The protective coating had developed a thin oxide scale less than 0.01 mm thick. However, Kirkendall porosity was evident at or adjacent to the coating/substrate interface. Composition alloy 3 of Table 2 was applied on substrate D of Table 3 above and burner rig tested for 504 hours at 1080° C. (1976° F.). The coating spalled in part during the burner rig run and, metallographically, appreciable interfacial porosity was observed.

Analysis of the factors associated with the formation of Kirkendall porosity lead to a series of preferred parameters for an inner layer designed to minimize excessive interdiffusion between the outer coating and the substrate. These parameters are:

A. No oxide dispersoid to act as a nucleus for Kirkendall porosity resulting from elemental diffusion out of the inner coating.

B. Since aluminum is the fastest diffusion principal element of both the outer coating and the substrate, the inner layer must minimize the propensity for diffusion by having an aluminum concentration within the limits defined by:

$$\frac{[Al]_{o.c.} + [Al]_s}{2} + 3 > [Al]_{i.c.} > \frac{[Al]_{o.c.} + [Al]_s}{2} - 3$$

Where $[Al]_{o.c., i.c., s}$ = aluminum concentration in weight percent in the outer coating, inner coating and substrate, respectively.

C. Chromium diffusion can result in appreciable Kirkendall porosity if the chromium gradient is excessively steep. This effect is minimized if:

$$\frac{[Cr]_{o.c.} + [Cr]_s}{2} + 10 > [Cr]_{i.c.} > \frac{[Cr]_{o.c.} + [Cr]_s}{2} - 10$$

Where $[Cr]_{o.c., i.c., s}$ = chromium concentration in weight persent in the outer coating, inner coating and substrate, respectively.

D. Solid solution strengtheners, such as tungsten, molybdenum, rhenium, (niobium and tantalum to a lesser extent), tend to diffuse slowly at near similar rates.

Thus, the solid solution strengtheners of the inner layer need only one half of the total solid solution strengthener content of the substrate as a minimum and, preferably, not exceed twice the total solid solution strengthener content of the substrate as a maximum.

E. Preferably, the nickel plus cobalt content is within plus or minus 10% of the average of the outer coating and the substrate but may be plus or minus 20% for less demanding operating conditions.

F. Other elements such as titanium, hafnium, zirconium and boron are usually present in such amounts as to not constitute a major contributing factor to Kirkendall porosity. Nevertheless, these elements in total should not constitute more than 1% of the composition of the inner layer for optimum service life.

Although NiCrAlY(Ta) is preferred, the outer coating may be selected from the general MCrAlY family where M includes Ni, Co, Fe, Ta and mixtures thereof.

The compositions of alloys 1 and 2 of Table 2 comprise an inner coating that meets the rigorous specifications for the substrates of Table 1 and the outer coating (composition 3) of Table 2. To establish the validity of the concept and quantify the performance, burner rig pins (9.5 mm diameter×75 mm length) of substrates A through G were fabricated by vacuum plasma spraying an inner coating of either composition 1 or 2 from Table 2 of approximately 100 to 200 microns on each pin. The pins were then heat treated in vacuum for 4 hours at 1080° C. (1976° F.) and the outer coating was then similarly applied and heat treated. The outer coatings of composition 3 were approximately 200 to 400 microns in thickness. The coatings were then burner rig tested as described above for 504 hours at 1082° C. (1980° F.). None of the coatings spalled during testing. Metallographic examination showed the coating system to be free of Kirkendall porosity in the substrate.

Commercial cast superalloys have been observed to experience Kirkendall porosity when coated with outer coating composition 3 of Table 2. The instant duplex coating should be applicable to these alloys as well as wrought and P/M superalloys.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A high temperature, corrosion resistant article of manufacture, the article comprising a mechanically alloyed oxide dispersion strengthened metal alloy substrate, a duplex coating on the substrate, the duplex coating including an inner coating substantially free of oxide dispersoids disposed on the substrate, and a corrosion resistant outer coating disposed on the inner coating, the outer coating of the MCrAlY type, wherein M is selected from the group consisting of nickel, cobalt, iron, and mixtures thereof.

2. The article of manufacture according to claim 1 wherein the outer coating includes tantalum.

3. The article of manufacture according to claim 1 including aluminum, the concentration of aluminum present according to the expression:

$$\frac{[Al]_{outer} + [Al]_{substrate}}{2} + 3 > [Al]_{inner} >$$

$$\frac{[Al]_{outer} + [Al]_{substrate}}{2} - 3$$

4. The article of manufacture according to claim 1 including chromium, the concentration of chromium present according to the expression:

$$\frac{[Cr]_{outer} + [Cr]_{substrate}}{2} + 10 > [Cr]_{inner} >$$

$$\frac{[Cr]_{outer} + [Cr]_{substrate}}{2} - 10$$

5. The article of manufacture according to claim 1 wherein the inner coating includes about: 15–20% chromium, 5–7% aluminum, 5–6% tantalum, up to 5% tungsten and the balance essentially nickel.

6. The article of manufacture according to claim 1 wherein the outer coating includes about: 20% chromium, 8% aluminum, 23% cobalt, 4% tantalum, 0.6% yttrium and the balance essentially nickel.

7. The article of manufacture according to claim 1 wherein the substrate includes about: 15–20% chromium, 0.3–4.5% aluminum, 0.5–2.5% titanium, up to 4% tungsten, up to 2% molybdenum, up to 2% tantalum, 0.6–1.1% yttria, up to 0.15% zirconium and the balance essentially nickel.

8. The article of manufacture according to claim 1 including solid solution strengtheners, the solid solution strengthener content of the inner layer being about one half of the total solid solution strengthener content of the substrate at a minimum and not exceeding twice the total solid solution strengthener content of the substrate as a maximum.

9. The article of manufacture according to claim 1 including nickel and cobalt, the nickel plus cobalt content of the inner layer between about plus or minus 20% of the average of the nickel plus cobalt contents of the outer coating and the substrate.

10. The article of manufacture according to claim 1 wherein the inner coating thickness is between 50 and 100 microns.

11. An oxide dispersion strengthened alloy substrate having a duplex coating thereon, the substrate alloy consisting of about: 15–20% chromium, 0.3–4.5% aluminum, 0.5–2.5% titanium, up to 4% tungsten, up to 2% molybdenum, up to 0.15% zirconium, 0.6–1.1% yttria, up to 2% tantalum, 0.05% carbon, 0.01% boron, the balance essentially nickel and trace elements, an inner coating substantially initially free of oxide dispersoids consisting of about: 15–20% chromium, 5–6.5% aluminum, 5–6% tantalum, up to 5% tungsten and the balance essentially nickel and trace elements and an outer coating consisting of about: 20% chromium, 8% aluminum, 23% cobalt, 4% tantalum, 0.6% yttria, the balance essentially nickel and trace elements.

12. A high temperature corrosion resistant duplex coating for alloy substrates, the coating comprising an inner coating substantially free of oxide dispersoids and an outer coating of the MCrAlY type disposed on the inner coating including oxide dispersoids therein and wherein M is selected from the group consisting of nickel, cobalt, iron and mixtures thereof.

13. The duplex coating according to claim 12 disposed on an oxide dispersion strengthened substrate.

14. The duplex coating according to claim 12 wherein the outer coating includes tantalum.

15. The duplex coating according to claim 12 including aluminum, the concentration of aluminum present according to the expression:

$$\frac{[Al]_{outer} + [Al]_{substrate}}{2} + 3 > [Al]_{inner} > \frac{[Al]_{outer} + [Al]_{substrate}}{2} - 3$$

16. The duplex coating according to claim 12 including chromium, the concentration of chromium present according to the expression:

$$\frac{[Cr]_{outer} + [Cr]_{substrate}}{2} + 10 > [Cr]_{inner} > \frac{[Cr]_{outer} + [Cr]_{substrate}}{2} - 10$$

17. The duplex coating according to claim 12 wherein the inner coating includes about: 15–20% chromium, 5–7% aluminum, 5–6% tantalum, up to 5% tungsten and the balance essentially nickel.

18. The duplex coating according to claim 12 wherein the outer coating includes about: 20% chromium, 8% aluminum, 23% cobalt, 4% tantalum, 0.6% yttrium and the balance essentially nickel.

19. The duplex coating according to claim 12 disposed on a substrate consisting of about: 15–20% chromium, 0.3–4.5% aluminum, 0.5–2.5% titanium, up to 4% tungsten, up to 2% molybdenum, up to 2% tantalum, 0.6–1.1% yttria, up to 0.15% zirconium and the balance essentially nickel.

20. The duplex coating according to claim 12 disposed on a mechanically alloyed substrate.

* * * * *